US009045155B1

(12) United States Patent
Minshull

(10) Patent No.: US 9,045,155 B1
(45) Date of Patent: Jun. 2, 2015

(54) MOVABLE SUPPORT APPARATUS AND METHOD

(71) Applicant: Mary Catherine Minshull, Gulf Breeze, FL (US)

(72) Inventor: Mary Catherine Minshull, Gulf Breeze, FL (US)

( * ) Notice: Subject to any disclaimer, the term of this patent is extended or adjusted under 35 U.S.C. 154(b) by 0 days.

(21) Appl. No.: 14/257,173

(22) Filed: Apr. 21, 2014

(51) Int. Cl.
*B62B 3/00* (2006.01)
*B62B 3/02* (2006.01)
*B62B 5/04* (2006.01)
*B62B 5/06* (2006.01)

(52) U.S. Cl.
CPC ............... *B62B 3/02* (2013.01); *B62B 5/0457* (2013.01); *B62B 5/06* (2013.01)

(58) Field of Classification Search
USPC ........ 280/47.34, 79.5, 47.371, 47.36; 16/900, 16/408
See application file for complete search history.

(56) References Cited

U.S. PATENT DOCUMENTS

| 5,253,757 A * | 10/1993 | Locker .......................... 206/449 |
| 6,488,293 B1 * | 12/2002 | Mitchell et al. ............. 280/47.34 |
| 2014/0049024 A1 * | 2/2014 | Strutt ............................ 280/433 |

* cited by examiner

*Primary Examiner* — John Walters
*Assistant Examiner* — James Triggs
(74) *Attorney, Agent, or Firm* — J. Nevin Shaffer, Jr.

(57) ABSTRACT

An improved movable support apparatus includes a support platform with a top, a bottom, sides and an inside and an outside. At least one wheel is connected with the bottom of the support platform. An attachment device is provided in the support platform where the attachment device consists of a receiver in the inside of the support platform, the receiver creating an upper stop and a lower stop in the support platform and where the attachment device further includes a retainer, the retainer located on the inside of the support platform interior from the upper stop of the receiver. A handle with at least one attachment hook is provided, the handle removably connectable with the attachment device retainer on the inside of the support platform and with the outside of the support platform such that when connected in the receiver with the attachment device movement of the handle causes movement of the support platform and where the handle is held in place by a combination of the at least one attachment hook and the retainer of the attachment device such that dislocation of the at least one attachment hook from the attachment device retainer releases the handle from the attachment device and the support platform.

19 Claims, 3 Drawing Sheets

MOVABLE SUPPORT APPARATUS AND METHOD

CROSS REFERENCE TO RELATED APPLICATION

This application is a Continuation in Part of pending U.S. patent application Ser. No. 12/800,769 filed May 21, 2010 entitled "Movable Support Apparatus and Method". The Applicant hereby claims the benefit of the non-provisional application under 35 U.S.C. §120. The entire content of this non-provisional application is incorporated herein by this reference.

FIELD OF THE INVENTION

This invention relates to an improved movable support apparatus and method. In particular, in accordance with one embodiment, the invention relates, to an improved movable support apparatus including a support platform with a top, a bottom, sides and an inside and an outside. At least one wheel is connected with the bottom of the support platform. An attachment device is provided in the support platform where the attachment device consists of a receiver in the inside of the support platform, the receiver creating an upper stop and a lower stop in the support platform and where the attachment device further includes a retainer, the retainer located on the inside of the support platform interior from the upper stop of the receiver. A handle with at least one attachment hook is provided, the handle removably connectable with the attachment device retainer on the inside of the support platform and with the outside of the support platform such that when connected in the receiver with the attachment device movement of the handle causes movement of the support platform and where the handle is held in place by a combination of the at least one attachment hook and the retainer of the attachment device such that dislocation of the at least one attachment hook from the attachment device retainer releases the handle from the attachment device and the support platform.

BACKGROUND OF THE INVENTION

Simple everyday "problems" are often tolerated until some inventive person finds a "solution". We would all still be opening our garage doors by hand if someone hadn't said "That's a problem. Let's put a motor on it!" The point here is that across the country many people have faced the task of moving heavy objects within their homes and offices. So long as they are strong enough and their back holds out, no problem. But as they age and their strength fades or their backs complain, this "non problem" becomes a very big problem indeed.

By way of example only and not by limitation, indoor and patio plants are often required to be moved for watering, sunning, or simple re-arrangement. The current state of the art is as set forth above. Lift it by hand and lug it to the new location. Over and over again. One partial solution is a "dolly". Various forms of dollies are known but they all include a support platform, wheels and an attached handle. The device is industrial in form in that it is designed to be used to move an object to a desired location. First the object must be lifted onto the dolly. Then the object and the dolly are moved to the new location. At that point, the object is lifted again and removed and the dolly placed back in the garage for storage. Every time the plant, for example only, needs to be moved, the dolly must be retrieved, used and returned. The plant must be lifted and set down and lifted and set down, over and over and over again. The current art process is injury prone and time consuming and adds clutter where most people don't need it, their garages.

What is needed, and what is missing in the art, is a device that allows a user to easily move an object, such as a plant, from one location to another, time after time with only one lift of the plant required. Further, the device should be easy to maneuver and yet be capable of being held stationary. It should be unobtrusive and essentially invisible when not in use such that no industrial elements are visible. The handle must, therefore, be removable but easily attachable and provide positive control of the device when attached.

It, therefore, is an object of this invention to provide an improved movable support apparatus that is easy to use, securable during non use and inconspicuous and that includes a removably attachable handle that provides positive control of the support apparatus when attached but is easily removed when desired and where the means of connection and disconnection are simple, easy to use and unobtrusive.

SUMMARY OF THE INVENTION

Accordingly, the improved movable support apparatus of the present invention, according to one embodiment includes a support platform with a top, a bottom, sides and an inside and an outside. At least one wheel is connected with the bottom of the support platform. An attachment device is provided in the support platform where the attachment device consists of a receiver in the inside of the support platform, the receiver creating an upper stop and a lower stop in the support platform and where the attachment device further includes a retainer, the retainer located on the inside of the support platform interior from the upper stop of the receiver. A handle with at least one attachment hook is provided, the handle removably connectable with the attachment device retainer on the inside of the support platform and with the outside of the support platform such that when connected in the receiver with the attachment device movement of the handle causes movement of the support platform and where the handle is held in place by a combination of the at least one attachment hook and the retainer of the attachment device such that dislocation of the at least one attachment hook from the attachment device retainer releases the handle from the attachment device and the support platform.

It should be understood that the terms of the invention are used in their broadest sense so that "support platform" is any surface capable of supporting another object. Thus, the "support platform" may be made of any supportive material, such as wood, plastic, and metal, for example only and not by way of limitation. Further, the support platform may take any desired shape, round, rectangular, oblong, etc., that is desired.

Additionally, the term "interior from" describes a position, in this case, further inside the support platform. That is, the distance to the retainer is farther, in a preferred embodiment, from the outside of the support than to the upper stop such that the attachment hook passes by the upper stop to reach the retainer.

In one aspect of the invention, the receiver includes a recessed portion in the top of the support platform that forms the upper stop and further that the receiver includes an opening in a side of the support platform that forms the lower stop.

In another aspect, the at least one attachment hook includes an S-shaped front with a top and a bottom and an S-shaped back with a top and a bottom where the bottom of the S-shaped front is connected with the bottom of the S-shaped back and the top of the S-shaped front is spaced apart from the top of the S-shaped back.

In a further aspect, the at least one attachment hook includes a front face and a back, where the front face includes a curved section and a flat section and where the back includes a curved section and a flat section. In one aspect, upon insertion of the at least one attachment hook into the receiver, the front face contacts the upper stop and the back face contacts the lower stop such that the upper stop and the lower stop guide the at least one attachment hook such that when the at least one attachment hook is connected with the retainer the flat section of the front face contacts the retainer on the inside of the support platform and the flat section of the back of the at least one attachment hook contacts the support platform on the outside of the support platform. In another aspect, the retainer is a flange with a front and a back and, in a further aspect, when connected, the flat section of the front face of the at least one attachment hook contacts the back of the flange on the inside of the support platform and where the flat section of the back of the at least one attachment hook contacts a side of the support platform on the outside of the support platform.

In one aspect, the at least one wheel includes a wheel lock.

According to another embodiment, an improved movable support apparatus consists of a support platform with a top, a bottom, sides and an inside and an outside. At least three wheels are connected with the bottom of the support platform. An attachment device is provided in the support platform where the attachment device consists of a receiver in the inside of the support platform, the receiver creating an upper stop and a lower stop in the support platform and where the attachment device further includes a retainer with a front and a back, the retainer downwardly extending from the top on the inside of the support platform interior from the upper stop of the receiver. A handle with at least one attachment hook is provided, the handle removably connectable with the attachment device such that the at least one attachment hook connects in the receiver with the attachment device retainer on the inside of the support platform and with the outside of the support platform such that movement of the handle causes movement of the support platform and where the handle is held in place by a combination of the at least one attachment hook and the attachment device retainer such that dislocation of the at least one attachment hook from the attachment device retainer releases the handle from the attachment device and the support platform.

In one aspect, the at least one attachment hook includes an S-shaped front with a top and a bottom and an S-shaped back with a top and a bottom where the bottom of the S-shaped front is connected with the bottom of the S-shaped back and the top of the S-shaped front is spaced apart from the top of the S-shaped back.

In another aspect, the at least one attachment hook includes a front face and a back, where the front face includes a curved section and a flat section and where the back includes a curved section and a flat section. In a further aspect, upon insertion of the at least one attachment hook into the receiver, the front face contacts the upper stop and the back face contacts the lower stop and the upper stop and the lower stop guide the at least one attachment hook such that when connected the flat section of the front face contacts the retainer on the inside of the support platform and the flat section of the back of the at least one attachment hook contacts the support platform on the outside of the support platform.

In one aspect, the retainer is a flange with a flat back and, in a further aspect, when connected, the flat section of the front face of the attachment hook contacts the flat back of the flange on the inside of the support platform and where the flat section of the back of the attachment hook contacts the outside of a side of the support platform.

According to another embodiment, an improved movable support method consists of the steps of:

a) providing a support platform with a top, a bottom, sides and an inside and an outside; at least one wheel connected with the bottom of the support platform; an attachment device in the support platform where the attachment device consists of a receiver in the inside of the support platform the receiver creating an upper stop and a lower stop in the support platform and where the attachment device further includes a retainer, the retainer located on the inside of the support platform interior from the upper stop of the receiver; a handle with at least one attachment hook the handle removably connectable with the attachment device retainer on the inside of the support platform and with the outside of the support platform such that when connected in the receiver with the attachment device movement of the handle causes movement of the support platform and where the handle is held in place by a combination of the at least one attachment hook and the retainer of the attachment device such that dislocation of the at least one attachment hook from the attachment device retainer releases the handle from the attachment device and the support platform; and b) inserting the at least one attachment hook into the receiver and connecting the at least one attachment hook with the attachment device retainer on the inside of the support platform and with the outside of the support platform.

In another aspect, the receiver includes a recessed portion in the top of the support platform that forms the upper stop and further that the receiver includes an opening in a side of the support platform that forms the lower stop.

In one aspect, the at least one attachment hook includes an S-shaped front with a top and a bottom and an S-shaped back with a top and a bottom where the bottom of the S-shaped front is connected with the bottom of the S-shaped back and the top of the S-shaped front is spaced apart from the top of the S-shaped back.

In a further aspect, the at least one attachment hook includes a front face and a back, where the front face includes a curved section and a flat section and where the back includes a curved section and a flat section. In another aspect, upon insertion of the at least one attachment hook into the receiver, the front face contacts the upper stop and the back face contacts the lower stop and the upper stop and the lower stop guide the at least one attachment hook such that when connected the flat section of the front face contacts retainer on the inside of the support platform and the flat section of the back of the at least one attachment hook contacts the support platform on the outside of the support platform.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Figure 1:
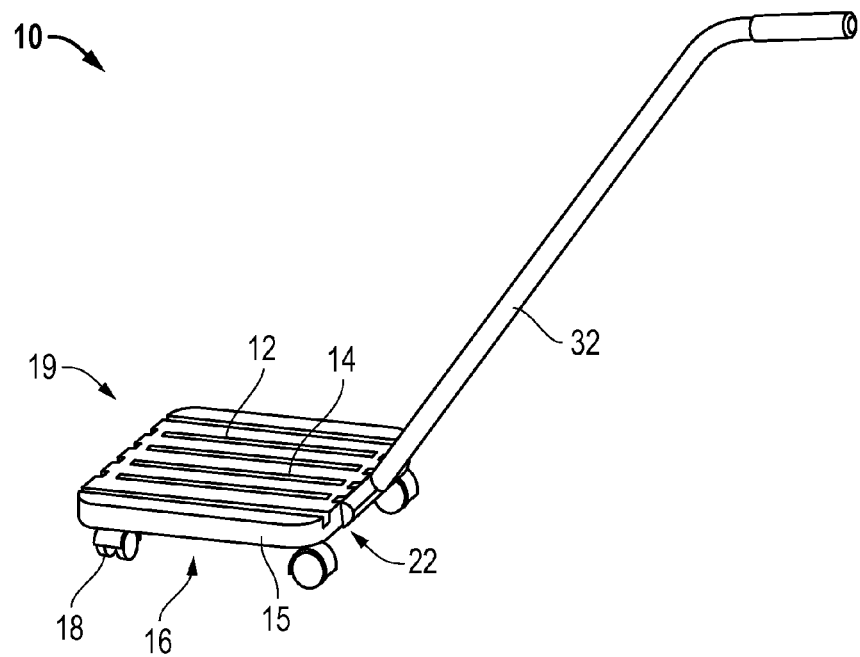
FIG. 1 is a perspective view of the improved movable support apparatus of the present invention according to one embodiment.

The preferred embodiment of the present invention is illustrated by way of example in FIGS. 1-7. With specific reference to FIGS. 1 and 2, an improved movable support apparatus 10 according to a preferred embodiment, includes a support platform 12 with a top 14, a bottom 16, sides 15, inside 17 and outside 19. One or more wheels 18, and preferably four wheels 18 as illustrated, are connected with the bottom 16 of support platform 12 as shown. Wheels 18 are connected with the bottom 16 of support platform 12 such that wheels 18 are free to rotate thus greatly increasing the maneuverability of improved movable support apparatus 10. At least one wheel 18 includes a lock 20. Lock 20 may be any type of lock for preventing movement of wheel 18 as now known or hereafter developed.

Figure 5:
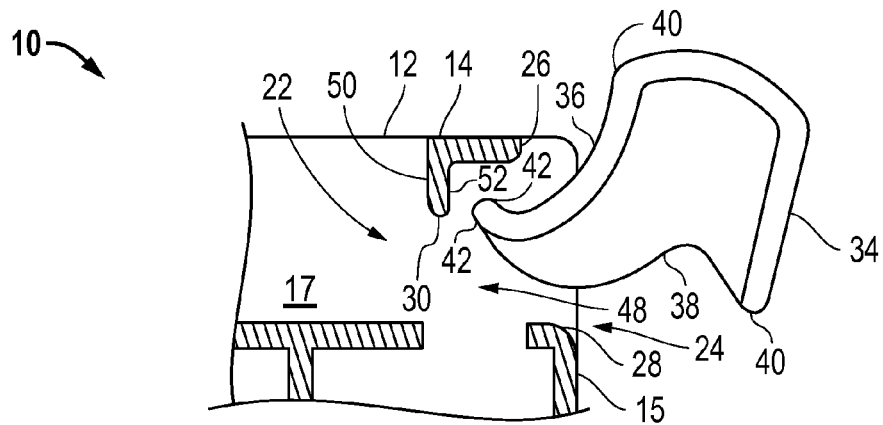
FIG. 5 is a side sectional view of a portion of the invention showing an attachment hook partially inserted into the receiver of the support platform.
Figure 6:
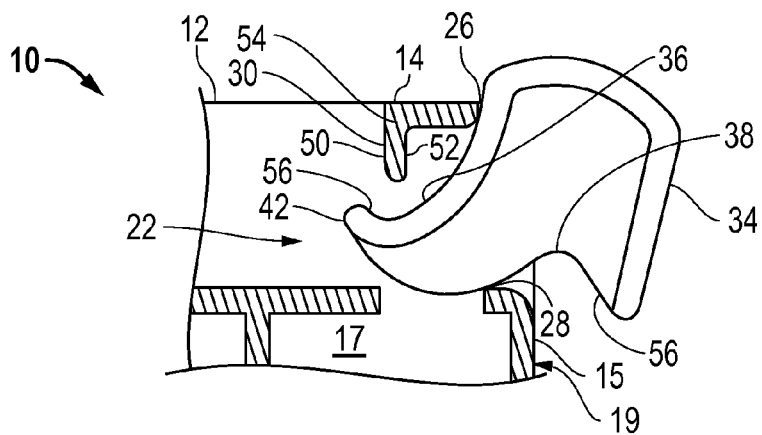
FIG. 6 is a continuation of the view of FIG. 5 showing an attachment hook guided into the support platform by an upper an lower stop.
Figure 7:
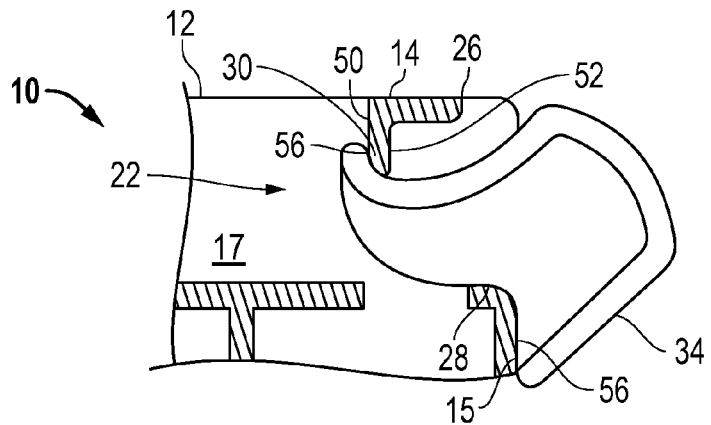
FIG. 7 is continuation of the view of FIG. 6 showing the attachment hook connected with the retainer on the inside of the support platform and with the outside of on side of the support platform.

An attachment device 22 is provided and, according to this embodiment, attachment device 22 consists of a receiver 24 (as more clearly shown in FIGS. 5-7). Receiver 24 is located on the inside 17 of support platform 12 and is essentially a hole from the outside 19 to the inside 17 of support platform 12 as will be described more fully hereafter. Receiver 24 creates an upper stop 26 and a lower stop 28 again as illustrated in FIGS. 5-7 and as will be described more fully hereafter. Attachment device 22 also includes a retainer 30 located on the inside 17 of the support platform 12 and interior of the upper stop 26 as best seen in FIGS. 5-7 and, again, as will be described more fully hereafter.

Figure 2:
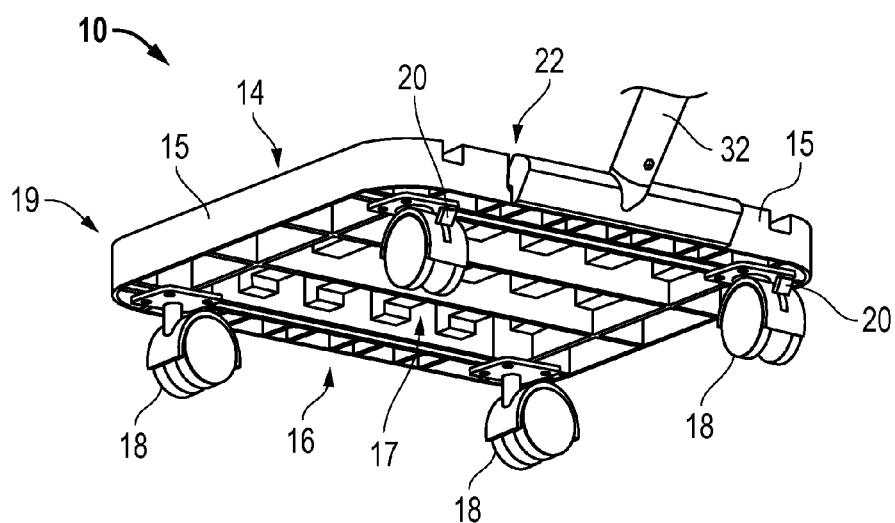
FIG. 2 is a bottom perspective view of the invention of FIG. 1 shown with a removable handle connected.

A handle 32 as shown in FIGS. 1 and 2 is provided for connection with the attachment device 22 such that, once connected, handle 32 provides a user the ability to easily push, pull or rotate movable support apparatus 10 without stooping or bending down as will be more fully described hereafter.

Figure 3:
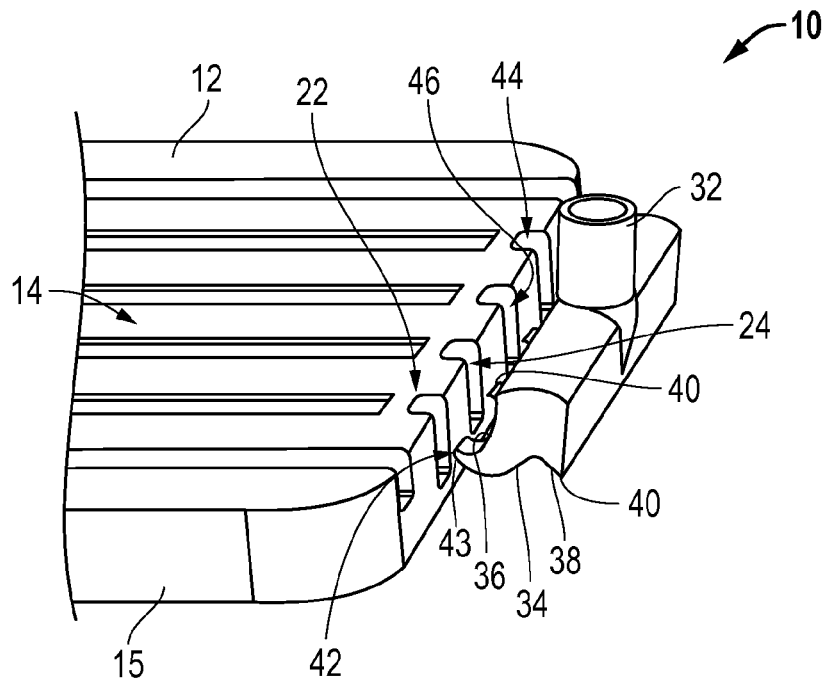
FIG. 3 is a side perspective partial view showing a portion of the handle with attachment hooks prior to connection with the support platform.

Handle 32 includes at least one attachment hook 34 (see FIG. 3). Attachment hook(s) 34 connect with the attachment device 22 in the receiver 24 on the inside 17 of support platform 12 and also with the outside 19 of support platform 12 when fully connected as will be more fully described hereafter.

Referring now to FIG. 3, a portion of handle 32 is shown with several attachment hooks 34. It can be seen that in one embodiment, attachment hooks 34 include a front 36 and a back 38 and the front 36 is S-shaped and the back 38 is S-shaped. Both S-shapes, front 36 and back 38, have a top 40 and a bottom 42. The bottom 42 of the S-shaped front 36 is shown connected with the bottom 42 of the S-shaped back 38 at numeral 43. The top 40 of S-shaped front 36 is spaced apart, however, from the top 40 of S-shaped back 38. This unique structure facilitates the simultaneous connection of the attachment hooks 34 on both the inside 17 and the outside 19 of support platform 12 as will be described more fully hereafter.

Figure 4:
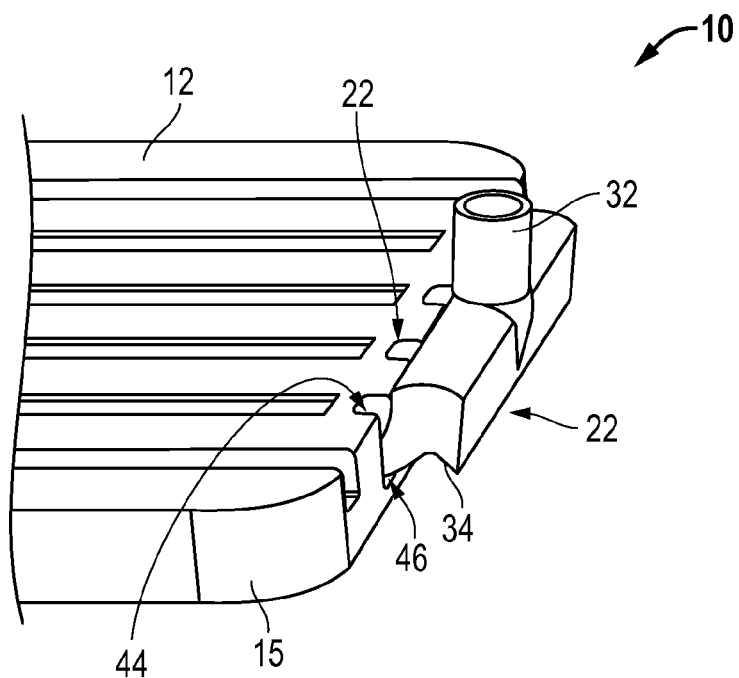
FIG. 4 is a view of FIG. 3 with the attachment hook inserting into the support platform.

FIGS. 3 and 4 also show that receiver 24 (not shown) creates a recess 44 in the top 14 of support platform 12 and an opening 46 in the side 15 of support platform 12. FIG. 4 shows attachment hooks 34 being inserted into receiver 24 recess 44 and opening 46.

Referring now to FIGS. 5-7, starting with FIG. 5, a small portion of the support platform 12 and one attachment hook 34 are shown in section for clarity. Again, attachment device 22 consists of two elements: receiver 24 and retainer 30. Receiver 24 consists of space 48 on the inside 17 of support platform 12. Further, receiver 24 includes upper stop 26 and lower stop 28. In one case, upper stop 26 is formed by removing a portion of the top 14 of support platform 12 to create recess 44. Likewise, lower stop 28 is formed by removing a portion of the side 15 of support platform 12 to create opening 46.

Retainer 30 is clearly shown in these figures and it can be understood that retainer 30 is "interior" of upper stop 26. By this, again, it is meant to describe that retainer 30 is further inside support platform 12 than upper stop 26 when measuring from the outside 19 from side 15 to the inside 17.

The description of the attachment hook 34 as having an S-shaped front 36 and an S-shaped back 38 is clearly illustrated along with the joining of the S-shaped bottoms 42 while the tops 40 are spaced apart.

FIG. 6 illustrates the functioning of the upper stop 26 and lower stop 28. Upon continued insertion of attachment hook 34 into the space 48 of receiver 24, the front 36 of the attachment hook 34 contacts upper stop 26. Likewise, the back 38 contacts the lower stop 28. The upper stop 26 prevents insertion of attachment hook 34 beyond the upper stop 26 and attachment hook 34 rotates down on lower stop 28 which raises the extended bottom 42 of attachment hook 34 as shown. Together, the upper stop 26 and lower stop 28 guide the attachment hook 34 toward connection with retainer 30.

Referring to FIGS. 6 and 7, in FIG. 7 attachment hook 34 is fully connected with support platform 12 both on the inside 17 and the outside 19. As shown, retainer 30 includes a front 50 and a back 52 and is attached to the top 14 of the inside 17 of support platform 12. Retainer 30 is illustrated in the form of a flange 54 with a flat front 50, by way of example only and not by limitation. Likewise, it is shown where the bottom 42 of the front 36 of attachment hook 34 includes a flat section 56. Flat section 56 of attachment hook 34 connects directly to flat front 50 of flange 54 as shown. This creates a solid secure connection.

FIGS. 6 and 7 show that at the same time, in one aspect of the invention, the back 38 of attachment hook 34 includes a flat section 56 that connects directly to the side 15 on the outside 19 of support platform 12.

Releasing the connection is as simple as tilting the handle 32 upward and withdrawing the attachment hook(s) from the receiver 24.

By way of further explanation, Applicant has spent countless hours developing the improved movable support apparatus 10. Applicant has found that the movable support apparatus 10 solves all of the existing problems with the prior art. Importantly, once a user has placed an object, such as a plant for example only, on the support platform 12, the user never has to lift the object again. The wheel locks 20 enable the user to secure the movable support apparatus 10 in the desired location. The handle 32 is removed after use so that all that remains visible is the support platform 12. This is a tremendous advantage over prior art dollies and such. In combination with wheels 18 that are free to rotate, as described above, the secure connection provided with the combination of the attachment hooks 34 on both the inside 17 and outside 19 of the support platform 12, the user is enabled to smoothly move the apparatus wherever needed. There is no need to bend over and push and pull and back and fill and endlessly maneuver the apparatus as with prior art dolly type devices.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. An improved movable support apparatus comprising:
   a) a support platform with a top, a bottom, sides and an inside and an outside;
   b) at least one wheel connected with said bottom of said support platform;
   c) an attachment device in said support platform wherein said attachment device consists of a receiver in said inside of said support platform said receiver creating an upper stop and a lower stop in said support platform wherein said receiver includes a recessed portion in said top of said support platform that forms said upper stop and further that the receiver includes an opening in a side of said support platform that forms said lower stop and wherein said attachment device further includes a retainer said retainer located on the inside of said support platform interior from said upper stop of said receiver; and
   d) a handle with at least one attachment hook said handle removably connectable with said attachment device retainer on the inside of said support platform and with the outside of said support platform such that when connected in said receiver with said attachment device movement of said handle causes movement of said support platform and wherein said handle is held in place by a combination of said at least one attachment hook and said retainer of said attachment device such that dislocation of said at least one attachment hook from said attachment device retainer releases said handle from said attachment device and the support platform.

2. The apparatus of claim 1 wherein said at least one attachment hook includes an S-shaped front with a top and a bottom and an S-shaped back with a top and a bottom wherein the bottom of said S-shaped front is connected with the bottom of the S-shaped back and the top of the S-shaped front is spaced apart from the top of said S-shaped back.

3. The apparatus of claim 1 wherein said at least one attachment hook includes a front face and a back, wherein said front face includes a curved section and a flat section and wherein said back includes a curved section and a flat section.

4. The apparatus of claim 3 wherein upon insertion of said at least one attachment hook into said receiver said front face contacts the upper stop and said back face contacts the lower stop such that the upper stop and the lower stop guide said at least one attachment hook such that when said at least one attachment hook is connected with said retainer said flat section of said front face contacts said retainer on the inside of said support platform and said flat section of said back of said at least one attachment hook contacts said support platform on the outside of said support platform.

5. The apparatus of claim 4 wherein said retainer is a flange with a front and a back.

6. The apparatus of claim 5 wherein, when connected, said flat section of said front face of said at least one attachment hook contacts the back of said flange on the inside of said support platform and wherein said flat section of said back of said at least one attachment hook contacts a side of said support platform on the outside of said support platform.

7. The apparatus of claim 1 wherein at least one wheel includes a wheel lock.

8. The apparatus of claim 1 wherein said retainer is a flange with a flat back.

9. The apparatus of claim 8 wherein, when connected, said attachment hook contacts the flat back of said flange on the inside of said support platform and wherein said attachment hook contacts the outside of a side of said support platform.

10. An improved movable support method comprising:
    a) providing a support platform with a top, a bottom, sides and an inside and an outside; at least one wheel connected with said bottom of said support platform; an attachment device in said support platform wherein said attachment device consists of a receiver in said inside of said support platform said receiver creating an upper stop and a lower stop in said support platform wherein said receiver includes a recessed portion in said top of said support platform that forms said upper stop and further that the receiver includes an opening in a side of said support platform that forms said lower stop and wherein said attachment device further includes a retainer said retainer located on the inside of said support platform interior from said upper stop of said receiver; a handle with at least one attachment hook said handle removably connectable with said attachment device retainer on the inside of said support platform and with the outside of said support platform such that when connected in said receiver with said attachment device movement of said handle causes movement of said support platform and wherein said handle is held in place by a combination of said at least one attachment hook and said retainer of said attachment device such that dislocation of said at least one attachment hook from said attachment device retainer releases said handle from said attachment device and the support platform; and
    b) inserting said at least one attachment hook into said receiver and connecting said at least one attachment hook with said attachment device retainer on the inside of said support platform and with the outside of said support platform.

11. The method of claim 10 wherein said at least one attachment hook includes an S-shaped front with a top and a bottom and an S-shaped back with a top and a bottom wherein the bottom of said S-shaped front is connected with the bottom of the S-shaped back and the top of the S-shaped front is spaced apart from the top of said S-shaped back.

12. The method of claim 10 wherein said at least one attachment hook includes a front face and a back, wherein said front face includes a curved section and a flat section and wherein said back includes a curved section and a flat section.

13. The method of claim 12 wherein upon insertion of said at least one attachment hook into said receiver said front face contacts the upper stop and said back face contacts the lower stop and the upper stop and the lower stop guide said at least one attachment hook such that when connected said flat section of said front face contacts said retainer on the inside of said support platform and said flat section of said back of said at least one attachment hook contacts said support platform on the outside of said support platform.

14. An improved movable support apparatus comprising:
    a) a support platform with a top, a bottom, sides and an inside and an outside;
    b) at least one wheel connected with said bottom of said support platform;

c) an attachment device in said support platform wherein said attachment device consists of a receiver in said inside of said support platform said receiver creating an upper stop and a lower stop in said support platform and wherein said attachment device further includes a retainer said retainer located on the inside of said support platform interior from said upper stop of said receiver; and d) a handle with at least one attachment hook said handle removably connectable with said attachment device retainer on the inside of said support platform and with the outside of said support platform such that when connected in said receiver with said attachment device movement of said handle causes movement of said support platform and wherein said handle is held in place by a combination of said at least one attachment hook wherein said at least one attachment hook includes an S-shaped front with a top and a bottom and an S-shaped back with a top and a bottom wherein the bottom of said S-shaped front is connected with the bottom of the S-shaped back and the top of the S-shaped front is spaced apart from the top of said S-shaped back and said retainer of said attachment device such that dislocation of said at least one attachment hook from said attachment device retainer releases said handle from said attachment device and the support platform.

15. The apparatus of claim 14 wherein said receiver includes a recessed portion in said top of said support platform that forms said upper stop and further that the receiver includes an opening in a side of said support platform that forms said lower stop.

16. The apparatus of claim 14 wherein said retainer is a flange with a flat back.

17. An improved movable support method comprising:

a) providing a support platform with a top, a bottom, sides and an inside and an outside; at least one wheel connected with said bottom of said support platform; an attachment device in said support platform wherein said attachment device consists of a receiver in said inside of said support platform said receiver creating an upper stop and a lower stop in said support platform and wherein said attachment device further includes a retainer said retainer located on the inside of said support platform interior from said upper stop of said receiver; a handle with at least one attachment hook said handle removably connectable with said attachment device retainer on the inside of said support platform and with the outside of said support platform such that when connected in said receiver with said attachment device movement of said handle causes movement of said support platform and wherein said handle is held in place by a combination of said at least one attachment hook, wherein said at least one attachment hook includes an S-shaped front with a top and a bottom and an S-shaped back with a top and a bottom wherein the bottom of said S-shaped front is connected with the bottom of the S-shaped back and the top of the S-shaped front is spaced apart from the top of said S-shaped back, and said retainer of said attachment device such that dislocation of said at least one attachment hook from said attachment device retainer releases said handle from said attachment device and the support platform; and b) inserting said at least one attachment hook into said receiver and connecting said at least one attachment hook with said attachment device retainer on the inside of said support platform and with the outside of said support platform.

18. The method of claim 17 wherein said receiver includes a recessed portion in said top of said support platform that forms said upper stop and further that the receiver includes an opening in a side of said support platform that forms said lower stop.

19. The method of claim 17 wherein said retainer is a flange with a flat back.

* * * * *